United States Patent
Mittag

(10) Patent No.: US 11,135,613 B2
(45) Date of Patent: Oct. 5, 2021

(54) METERING VALVE

(71) Applicant: Atlas Copco IAS GmbH, Bretten (DE)

(72) Inventor: Sten Mittag, Karlsruhe (DE)

(73) Assignee: ATLAS COPCO IAS GMBH, Bretten (DE)

( * ) Notice: Subject to any disclaimer, the term of this patent is extended or adjusted under 35 U.S.C. 154(b) by 0 days.

(21) Appl. No.: 16/772,335

(22) PCT Filed: Jan. 7, 2019

(86) PCT No.: PCT/EP2019/050252
§ 371 (c)(1),
(2) Date: Jun. 12, 2020

(87) PCT Pub. No.: WO2019/154570
PCT Pub. Date: Aug. 15, 2019

(65) Prior Publication Data
US 2021/0078032 A1    Mar. 18, 2021

(30) Foreign Application Priority Data

Feb. 9, 2018    (DE) ...................... 10 2018 001 048.2

(51) Int. Cl.
*F16K 31/00* (2006.01)
*B05C 11/10* (2006.01)
*F16K 31/06* (2006.01)

(52) U.S. Cl.
CPC ........ *B05C 11/1028* (2013.01); *F16K 31/004* (2013.01); *F16K 31/007* (2013.01);
(Continued)

(58) Field of Classification Search
CPC .... F16K 31/004; F16K 31/007; F16K 31/008; F16K 31/06; F16K 31/0644;
(Continued)

(56) References Cited

U.S. PATENT DOCUMENTS 4,883,025 A  * 11/1989 Richeson, Jr. .......... F01L 1/462
                                                                123/90.11
4,955,535 A  *  9/1990 Tsutsui ............... G05D 23/1393
                                                                236/12.12
(Continued)

FOREIGN PATENT DOCUMENTS

DE          35 18 750 C2    4/1988
WO         2016/159338 A1   10/2016

OTHER PUBLICATIONS

International Search Report of PCT/EP2019/050252, dated Apr. 11, 2019.
(Continued)

*Primary Examiner* — Matthew W Jellett
(74) *Attorney, Agent, or Firm* — Collard & Roe, P.C.

(57) ABSTRACT

A metering valve has a closing member and a valve seat. The closing member is movable between a closed position on the valve seat sealing a material outlet, and an open position raised above the valve seat leaving the outlet clear. An actuating element rigidly connected to the closing member is arranged between first and second piezo-actuators at a distance from the first piezo-actuator in the closed position less than the maximum length change of the first piezo-actuator, or lies loosely thereon and at a distance from the second piezo-actuator longer than the maximum length change of the first piezo-actuator. The actuating element in the open position is arranged at a distance from the second piezo-actuator less than the maximum length change of the second piezo-actuator, or lies loosely thereon and at a distance from the first piezo-actuator greater than the maximum length change of the second piezo-actuator.

12 Claims, 1 Drawing Sheet

(52) U.S. Cl.
CPC ........ *F16K 31/008* (2013.01); *F16K 31/0655* (2013.01); *F16K 31/0675* (2013.01); *F16K 31/0658* (2013.01)

(58) Field of Classification Search
CPC .............. F16K 31/0648; F16K 31/0655; F16K 31/0658; F16K 31/0675; F16K 31/0679; F16K 31/084; F02M 51/061; F02M 51/0614; F02M 51/0617; F02M 63/0026; B05C 11/1028
USPC ...... 251/65, 68, 69, 129.01, 129.02, 129.05, 251/129.06; 239/102.2; 123/498
See application file for complete search history.

(56) References Cited

U.S. PATENT DOCUMENTS

| | | | | |
|---|---|---|---|---|
| 6,019,346 A * | 2/2000 | Miller | ................... | F16K 31/005 137/625.28 |
| 6,164,322 A * | 12/2000 | Najmolhoda | ......... | F15B 13/024 137/539 |
| 6,202,670 B1 * | 3/2001 | O'Neill | ................. | F16K 31/007 137/625.5 |
| 6,313,568 B1 | 11/2001 | Sullivan et al. | | |
| 6,811,093 B2 * | 11/2004 | Rado | .................. | F02M 51/0603 239/102.2 |
| 6,817,592 B2 * | 11/2004 | Mianzo | ................... | F01L 1/143 251/54 |
| 6,892,956 B2 * | 5/2005 | Yildirim | ............ | F02M 51/0603 239/102.2 |
| 6,896,236 B2 * | 5/2005 | Wang | ................... | F16K 31/0689 251/30.01 |
| 7,267,043 B2 * | 9/2007 | Wright | .................. | F04B 43/046 92/103 R |
| 7,343,845 B2 * | 3/2008 | Wirtl | .................... | G05D 16/163 91/358 R |
| 8,777,179 B2 * | 7/2014 | Hess | ...................... | F16K 31/004 251/129.06 |
| 8,783,652 B2 * | 7/2014 | Dinh | ................. | H01L 21/02104 251/129.06 |
| 9,970,566 B2 * | 5/2018 | Rovera | .................. | F16K 31/086 |
| 10,016,778 B2 | 7/2018 | Ikushima | | |
| 10,174,858 B2 * | 1/2019 | Hirata | .................. | G05D 7/0635 |
| 10,767,778 B2 * | 9/2020 | Jakiewicz | ............ | F16K 31/006 |
| 2015/0302292 A1 | 10/2015 | Hong et al. | | |
| 2015/0369373 A1 * | 12/2015 | Reith | .................... | F16K 31/007 251/129.01 |
| 2016/0004257 A1 | 1/2016 | Fliess et al. | | |
| 2016/0136664 A1 | 5/2016 | Hong et al. | | |

OTHER PUBLICATIONS

German Office Action dated Nov. 12, 2018 in DE 10 2018 001 048.2, with English translation of relevant parts.
Letter from German patent attorney to German Patent and Trademark Office dated Feb. 6, 2019 regarding German Application No. DE 10 2018 001 048.2, with English translation of relevant parts.
English translation of the International Preliminary Report on Patentability and Written Opinion of the International Searching Authority in PCT/EP2019/050252, dated Aug. 20, 2020.

* cited by examiner

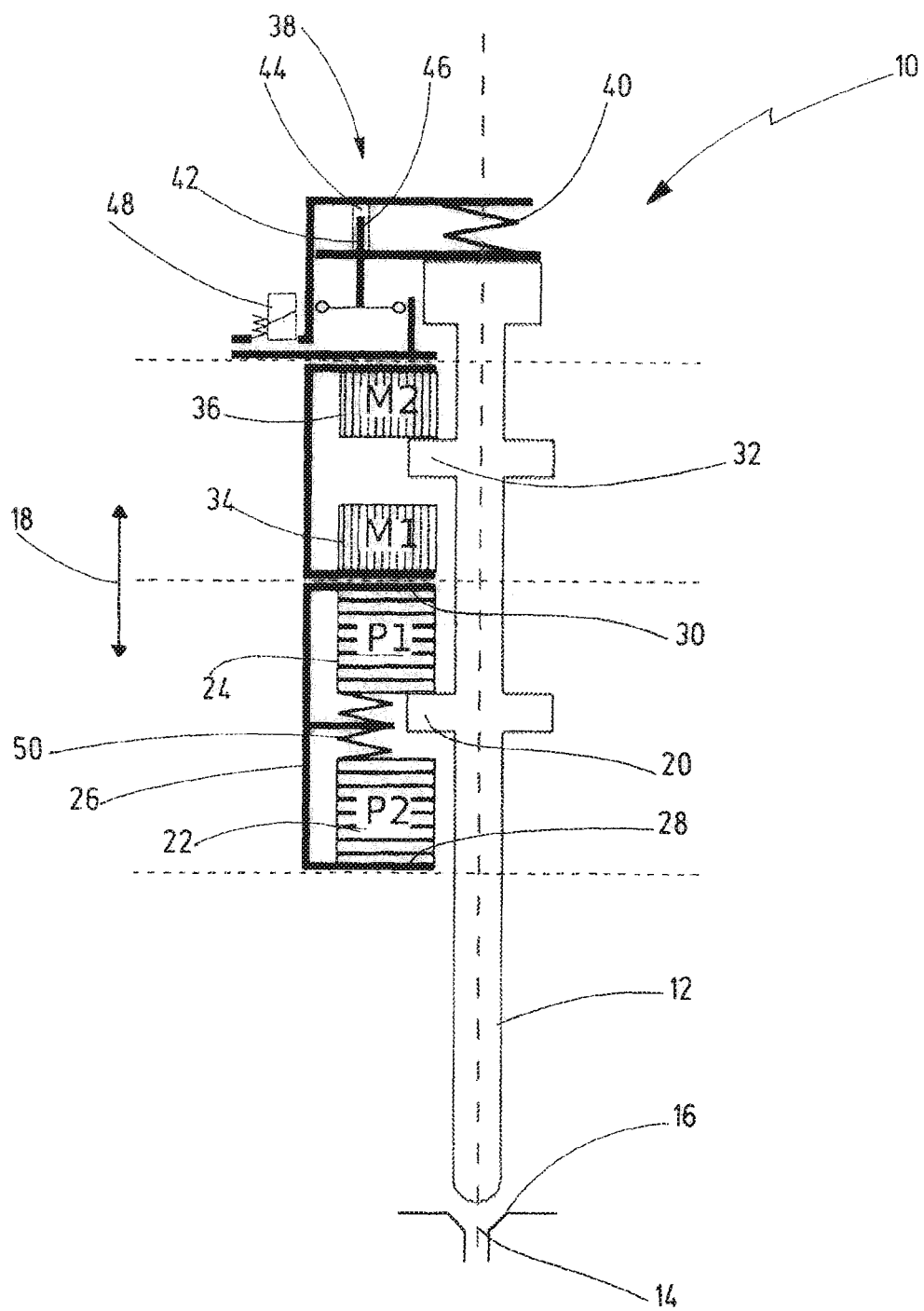

METERING VALVE

CROSS REFERENCE TO RELATED APPLICATIONS

This application is the National Stage of PCT/EP2019/050252 filed on Jan. 7, 2019, which claims priority under 35 U.S.C. § 119 of German Application No. 10 2018 001 048.2 filed on Feb. 9, 2018, the disclosure of which is incorporated by reference. The international application under PCT article 21(2) was not published in English.

The invention relates to a metering valve, in particular for metering of viscous materials such as adhesives, sealants, insulation materials or heat conduction pastes.

Metering valves are used everywhere where materials must be dispensed in metered amounts. In particular, metering valves are used to apply viscous materials such as adhesives, sealants, insulation materials or heat conduction pastes onto workpieces in automobile production. In this regard, the smallest possible amount that can be metered depends on how quickly the metering valves can be opened and then closed again. The application frequency of dot-shaped doses of the viscous material is also dependent on how quickly the metering valve can be switched to open and close. In order to achieve rapid opening and closing, piezo-actuators have already been proposed, whose voltage-induced length change is transferred to the closing body of the metering valve. Metering valves controlled by means of piezo-actuators are characterized by a high switching frequency. In this regard, it has already been proposed, on the one hand, to use a piezo-actuator for opening the valve, while closing takes place by means of a reset element such as a spring, for example.

On the other hand, it has been proposed to use a piezo-actuator coupled with the closing body both for opening and for closing, in each instance.

It is the task of the invention to develop a metering valve that can be switched even more quickly.

This task is accomplished, according to the invention, by means of a metering valve having the characteristics of claim 1. Advantageous further developments of the invention are the object of the dependent claims.

The invention is based on the idea of opening the metering valve with a first piezo-actuator and closing it with a second piezo-actuator, without the piezo-actuators being rigidly coupled with the closing body. For this purpose, the metering valve has an activation element firmly connected with the closing body, so that the closing body is moved along when the activation element is moved. In the closed position, in which the closing body sits on the valve seat and closes off a material outlet of the metering valve, the activation element either lies loosely against the first piezo-actuator or is arranged at a distance from it, which distance is less than the maximal length expanse of the actuator when voltage is applied to it. At the same time, the activation element is arranged at a distance from the second piezo-actuator, which distance is greater than the maximal length expanse of the first piezo-actuator. To open the metering valve, voltage is applied to the first piezo-actuator, so that it expands on the basis of the piezo effect and, because of its change in length, applies a pulse to the activation element. The activation element is then "shot" away from the first piezo-actuator, taking the closing body along with it, so that the closing body gets into the open position, in which it is lifted off from the valve seat and releases the material outlet. In the open position, the activation element lies against the second piezo-actuator or is arranged at a distance from the second piezo-actuator, which distance is less than the maximal length expanse of the actuator when voltage is applied to it. At the same time, in the open position the activation element is arranged at a distance from the first piezo-actuator, which distance is greater than the maximal length expanse of the second piezo-actuator. To close the metering valve, voltage is applied to the second piezo-actuator, and it expands due to the piezo effect. Because of its length change, it applies a pulse to the activation element and "shoots" the latter in the direction toward the first piezo-actuator, wherein it takes the closing body along with it and moves it into the closed position.

It is practical if the metering valve has a rigid frame having two support surfaces that face one another, wherein the first piezo-actuator is supported on a first one of the support surfaces and the second piezo-actuator is supported on the second one of the support surfaces. The frame applies the required counter-force when the piezo-actuators apply force to the activation element so as to move the closing body. In this regard, it is preferred that the distance between the support surfaces relative to one another can be variably adjusted, so that the stroke of the closing body can be varied.

Since the piezo-actuators are not rigidly connected with the activation element, they cannot hold the closing body in the closed position or in the open position. For this purpose, it is practical if first holding means for holding the closing body in place in the closed position and/or second holding means for holding the closing body in place in the open position are provided. It is practical if the first holding means and/or the second holding means have at least one electromagnet. Furthermore, it is preferred that a holding element composed of ferromagnetic material is firmly connected with the closing body, which element can have a force, preferably an attraction force applied to it by at least one electromagnet of the first holding means and/or by at least one electromagnet of the second holding means. In this regard, it is practical if the holding element is arranged so as to move back and forth between the first holding means and the second holding means.

It is advantageous if the metering valve has a safety device that comprises a spring that applies force to the closing body in the direction toward the valve seat, and a pneumatic cylinder having a pressure chamber. The piston of the pneumatic cylinder applies force to the closing body, counter to the force of the spring, when compressed air is introduced into the pressure chamber. It is practical if the pneumatic cylinder has an electrically switchable safety valve for closing off the pressure chamber, which valve opens in the current-free state. In the event of a power failure, the force applied to the piston fails, so that the spring forces the closing body onto the valve seat.

It is preferred that a pressure spring that is supported on the piezo-actuators is arranged between the first piezo-actuator and the second piezo-actuator. By means of this measure, the two piezo-actuators are supported on one another, and their expansion always takes place counter to a force, so that delamination of the piezo-actuators, in particular, is prevented.

In the following, the invention will be explained in greater detail using an exemplary embodiment shown schematically in the drawing. This shows:

FIG. 1 a schematic sketch for illustrating the method of functioning of a metering valve.

In the drawing, a metering valve 10 configured as a needle valve is shown schematically; it comprises a valve needle as a closing body 12, which needle can set onto a valve seat 16 to close off a material outlet 14 and can be lifted off from the valve seat 16 to release the material outlet 14. To close off and release the material outlet 14, the valve needle 12 can be moved back and forth linearly in a longitudinal direction 18.

An activation element 20 is firmly connected with the valve needle 12, which element projects radially away from the valve needle 12. The activation element 20 is arranged between a first piezo-actuator 22 and a second piezo-actuator 24, which are each supported on a rigid frame 26. The frame 26 has two support surfaces 28, 30 that face one another, wherein the first piezo-actuator 22 is supported on a first support surface 28 and the second piezo-actuator 24 is supported on a second support surface 30.

If the valve needle 12 is in a closed position in which it sits on the valve seat 16, then the activation element 20 lies against the first piezo-actuator 22 or is arranged at a slight distance from it. If the valve needle 12 is in an open position, in which it is lifted off from the valve seat 16, as shown in FIG. 1, then the activation element 20 lies against the second piezo-actuator 24 or is situated at a slight distance from it. To open the needle valve 10, an electrical voltage is applied to the first piezo-actuator 22, and the latter expands due to the piezo effect. Its change in length in the longitudinal direction 18 leads to the result that a pulse is applied to the activation element 20, and the latter is moved in the direction toward the second piezo-actuator 24, so that the element can take the valve needle 12 along with it and lift it off from the valve seat 16. For this purpose, when the valve needle 12 is situated in the closed position, the activation element 20 is only allowed to be arranged at a distance from the first piezo-actuator 22 that is less than the maximal length expanse of the actuator in the longitudinal direction 18. At the same time, the activation element 20 must be arranged at a distance from the second piezo-actuator 24 that is greater than the maximal change in length of the first piezo-actuator 22 in the longitudinal direction 18. The second piezo-actuator 24 limits the stroke of the valve needle 12, in that the activation element 20 cannot be moved farther away from the first piezo-actuator 22 than the point at which it makes contact with the second piezo-actuator 24.

To close the needle valve 10, an electrical voltage is applied to the second piezo-actuator 24 and the latter expands. Due to its change in length in the longitudinal direction 18, it applies a pulse to the activation element 20, so that the latter is moved away from the second and toward the first piezo-actuator 22. In this regard, it takes the valve needle 12 along with it, so that the latter can sit on the valve seat 16 again and thereby gets into the closed position, in which it closes off the material outlet 14. In the open position, therefore the activation element 20 must either lie loosely against the second piezo-actuator 24 or be arranged at a distance from it that is less than the maximal change in length of the second piezo-actuator 24 in the longitudinal direction 18. Furthermore, when the valve needle 12 is situated in the open position, the activation element 20 must be arranged at a distance from the first piezo-actuator 22 that is greater than the maximal change in length of the second piezo-actuator 24 in the longitudinal direction 18.

In order to be able to hold the valve needle 12 fixed in place in the closed position and in the open position, the valve needle 12 is firmly connected with a radially projecting holding element 32 composed of a ferromagnetic material. The holding element 32 is arranged between a first holding means 34 in the form of a first electromagnet and a second holding means 36 in the form of a second electromagnet. The electromagnets 34, 36 are switched in such a manner that the holding element 32 lies against the first electromagnet 34 in the closed position of the needle valve 12, and is attracted by it, while is lies against the electromagnet 36 in the open position of the valve needle 12, and is attracted by it.

The needle valve 10 furthermore has a safety device 38 that has a fail-safe function and ensures that in the event of a power failure, the material outlet 14 is closed off. The safety device 38 has a reset element in the form of a spring 40, which applies a force to the valve needle 12 in the longitudinal direction 18, toward the valve seat 16. A pneumatic cylinder 42, which has a pressure chamber 44 and a piston 46 arranged in the pressure chamber 44, works counter to the spring force. By means of introducing compressed air into the pressure chamber 44, a force is exerted on the valve needle 12, which force is directed counter to the force of the spring 40. A safety valve 48 connects the pressure chamber 44 with the environment and opens up in the power-free state, so that the compressed air escapes out of the pressure chamber 44, and the force directed against the spring force is eliminated, so that the spring 40 can press the valve needle 12 onto the valve seat 16.

A pressure spring 50 is arranged between the first piezo-actuator 22 and the second piezo-actuator 24, lying against them, which spring is tensed when the distance between the piezo-actuators 22, 24 is reduced, so that it exerts a force to counteract expansion of the piezo-actuators 22, 24.

In summary, the following should be stated. The invention relates to a metering valve 10 having a closing body 12 and a valve seat 16, wherein the closing body 12 can be moved back and forth in a longitudinal direction 18, between a closed position, in which it sits on the valve seat 16 and closes off a material outlet 14, and an open position, in which it is lifted off from the valve seat 16 and releases the material outlet 14, having an activation element 20 firmly connected with the closing body 12 and having two piezo-actuators 22, 24, between which the activation element 20 is arranged, wherein in the closed position, the activation element 20 is arranged at a distance from a first one of the piezo-actuators 22, which distance is less than the maximal change in length of the first piezo-actuator 22 in the longitudinal direction 18, or lies loosely against the first piezo-actuator 22 and is arranged at a distance from the second one of the piezo-actuators 24, which distance is greater than the maximal change in length of the first piezo-actuator 22 in the longitudinal direction 18, and wherein in the open position, the activation element 20 is arranged at a distance from the second piezo-actuator 24 that is less than the maximal change in length of the second piezo-actuator 24 in the longitudinal direction 18, or lies loosely against the second piezo-actuator 24 and is arranged at a distance from the first piezo-actuator 22 that is greater than the maximal change in length of the second piezo-actuator 24 in the longitudinal direction 18.

The invention claimed is:

1. A metering valve having a closing body (12) and a valve seat (16), wherein the closing body (12) can be moved back and forth between a closed position, in which it sits on the valve seat (16) and closes off a material outlet (14), and an open position, in which it is lifted off from the valve seat (16) and releases the material outlet (14), having an activation element (20) firmly connected with the closing body (12) and having two piezo-actuators (22, 24), between which the activation element (20) is arranged, wherein in the closed position, the activation element (20) is arranged at a distance from a first one of the piezo-actuators (22), which distance is less than the maximal change in length of the first piezo-actuator (22), or lies loosely against the first piezo-actuator (22) and is arranged at a distance from the second one of the piezo-actuators (24), which distance is greater than the maximal change in length of the first piezo-actuator (22), and wherein in the open position, the activation element (20) is arranged at a distance from the second piezo-actuator (24) that is less than the maximal change in length of the second piezo-actuator (24), or lies loosely against the second piezo-actuator (24) and is arranged at a distance from the first piezo-actuator (22) that is greater than the maximal change in length of the second piezo-actuator (24).

2. The metering valve according to claim 1, comprising a rigid frame (26) having two support surfaces (28, 30) that face one another, wherein the first piezo-actuator (22) is supported on a first one of the support surfaces (28) and the second piezo-actuator (24) is supported on the second one of the support surfaces (30).

3. The metering valve according to claim 2, wherein the distance between the support surfaces (28, 30) relative to one another can be variably adjusted.

4. The metering valve according to claim 1, comprising first holding means (34) for holding the closing body (12) in place in the closed position.

5. The metering valve according to claim 1, comprising second holding means (36) for holding the closing body (12) in place in the open position.

6. The metering valve according to claim 4, wherein the first holding means (34) and/or the second holding means (36) have at least one electromagnet.

7. The metering valve according to claim 6, comprising a holding element (32) composed of ferromagnetic material that is firmly connected with the closing body (12), which element can have a force applied to it by at least one electromagnet of the first holding means (34) and/or by at least one electromagnet of the second holding means (36).

8. The metering valve according to claim 7, wherein the holding element (32) is arranged so as to move back and forth between the first holding means (34) and the second holding means (36).

9. The metering valve according to claim 1, comprising a safety device (38) that comprises a reset element (40) that applies force to the closing body (12) in the direction toward the valve seat (16), and a pneumatic cylinder (42) having a pressure chamber (44), the piston (46) of which cylinder applies force to the closing body (12), counter to the force of the reset element (40), when compressed air is introduced into the pressure chamber (44).

10. The metering valve according to claim 9, wherein the pneumatic cylinder (42) has an electrically switchable safety valve (48) for closing off the pressure chamber (44), which valve opens in the current-free state.

11. The metering valve according to that claim 1, wherein a pressure spring (50) that is supported on the piezo-actuators (22, 24) is arranged between the first piezo-actuator (22) and the second piezo-actuator (24).

12. A method for metering liquid, using the metering valve (10) according to claim 1, wherein in order to lift the closing body (12) off from the valve seat (16), the first piezo-actuator (22) is expanded and transfers a pulse to the activation element (20), which pulse moves the activation element (20) away from the first piezo-actuator (22), and that wherein in order to set the closing body (12) onto the valve seat (16), the second piezo-actuator (24) is expanded and transfers a pulse to the activation element (20), which pulse moves the activation element (20) away from the second piezo-actuator (24).

* * * * *

UNITED STATES PATENT AND TRADEMARK OFFICE
CERTIFICATE OF CORRECTION

PATENT NO. : 11,135,613 B2  
APPLICATION NO. : 16/772335  
DATED : October 5, 2021  
INVENTOR(S) : Sten Mittag Page 1 of 1

It is certified that error appears in the above-identified patent and that said Letters Patent is hereby corrected as shown below:

In the Claims

In Claim 12, Line 7 (Column 6, Line 27): before "wherein" delete "that"

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*